United States Patent [19]

Adiletta

[11] Patent Number: 4,578,826
[45] Date of Patent: Apr. 1, 1986

[54] PROCESS FOR THE MANUFACTURE OF PROTECTIVE HAND COVERINGS

[75] Inventor: Joseph G. Adiletta, Thompson, Conn.

[73] Assignee: Pall Corporation, New York, N.Y.

[21] Appl. No.: 566,407

[22] Filed: Dec. 28, 1983

[51] Int. Cl.$^4$ .................... A41D 19/00; B29C 41/50
[52] U.S. Cl. .......................................... 2/167; 264/87; 264/101; 264/122; 264/129; 264/257; 264/571; 425/85
[58] Field of Search ............... 264/257, 101, 102, 87, 264/571, 109, 122, 129; 425/85; 2/167

[56] References Cited

U.S. PATENT DOCUMENTS

| | | | |
|---|---|---|---|
| 2,803,615 | 8/1957 | Ahlbrecht | 524/805 |
| 3,124,807 | 3/1964 | Frenkel et al. | 2/169 |
| 3,250,839 | 5/1966 | De Luca | 264/102 X |
| 3,489,148 | 1/1970 | Duncan et al. | 129/284 |
| 3,575,899 | 4/1971 | Pryor et al. | 428/327 |
| 3,746,679 | 7/1973 | Seipel, Jr. | 524/317 |
| 3,793,138 | 2/1974 | Rohrer | 162/219 |
| 3,824,126 | 7/1974 | Katsushima et al. | 427/394 |
| 3,934,062 | 1/1976 | Tillotson et al. | 427/185 |
| 3,945,049 | 3/1976 | Barlow | 156/251 |
| 3,945,062 | 3/1976 | Tillotson et al. | 4/227 |
| 3,950,588 | 4/1976 | McDougal | 428/422 |
| 4,058,647 | 11/1977 | Inoue et al. | 428/474 |
| 4,097,297 | 6/1978 | Keene | 106/177 |
| 4,135,029 | 1/1979 | Pfeffer | 428/284 |
| 4,321,404 | 3/1982 | Williams et al. | 560/115 |
| 4,433,439 | 2/1984 | Sidman et al. | 2/161 |

FOREIGN PATENT DOCUMENTS

| | | |
|---|---|---|
| 53143716 | 12/1971 | Japan . |
| 55-69677 | 5/1980 | Japan . |
| 837963 | 6/1981 | U.S.S.R. ............... 264/101 |

OTHER PUBLICATIONS

M. K. Lindemann, "Vinyl Acetate/Ethylene Emulsion Copolymers", *Paint Manufacture*, Sep. 1968.

Primary Examiner—Philip Anderson
Attorney, Agent, or Firm—Leydig, Voit & Mayer, Ltd.

[57] ABSTRACT

A flexible, microporous, hydrophobic and oleophobic protective handcovering and a process for its manufacture. The process generally comprises the steps of immersing a fabric shell having the configuration of a human hand in a liquid slurry comprised of inorganic, reinforcing microfibers and a polymeric binding agent in the form of a continuous matrix and drawing a vacuum in the interior of the fabric shell to cause the binding agent and fibers from the slurry to be deposited on the outer surface of the shell. The resulting composite structure is then cured to set the matrix in the desired shape. A treating agent, preferably a fluorinated hydrocarbon, is applied to the composite structure in an amount sufficient to render the handcovering both hydrophobic and oleophobic.

16 Claims, 2 Drawing Figures

PROCESS FOR THE MANUFACTURE OF PROTECTIVE HAND COVERINGS

BACKGROUND OF THE INVENTION

This invention relates generally to a process for coating fabrics to produce gas permeable composite structures suitable for use in protective clothing. More particularly, this invention relates to a process for the manufacture of flexible, microporous, hydrophobic, oleophobic, inorganic microfiber reinforced hand coverings and to the articles produced thereby.

Protective hand coverings are used in many occupations either to protect materials from contamination by the wearer, as in surgical use, bakeries and similar applications where strict hygiene is required, or to protect the wearer from contamination by the materials with which he is working, as in the cleanup of chemical waste sites. In this latter regard, there is a need for a flexible hand covering that (1) will resist passage of both oil- and water-based compositions and (2) is gas permeable to allow passage of air and water vapor through the material from the body side to the atmosphere. Detergent and solvent resistant characteristics may also be valuable since the nature of the compositions encountered is not always known.

Similarly, the need for protective hand coverings for military personnel, who may be exposed to deleterious oil and water-based aerosols by virtue of field conditions, calls for the development of processes whereby light-weight flexible or pliant, microporous, hydrophobic, oleophobic structures can be easily manufactured.

DISCLOSURE OF THE INVENTION

The subject invention provides a process for depositing a slurry comprised of microfibers and a binding agent directly onto a layer of cloth or fabric shell having the general configuration of a human hand. The fabric on which the slurry is deposited is preferably surface treated with isopropyl alcohol or the like to insure a surface free of grease and other contaminants so that a strong integrated structure is obtained. The integrated composite structure of this invention is then surface treated to render it hydrophobic and oleophobic, and also, preferably, detergent and solvent resistant.

In accordance with the invention, a fabric shell, preferably formed of a polyester, a polyamide, a polyaramid, cotton or rayon, is placed on a perforated form, which may be made of a stainless steel mesh, and immersed in a liquid slurry comprised of inorganic, reinforcing microfibers and a polymeric binding agent in the form of a continuous matrix. A suction is drawn in the interior of the perforated form, thus causing a coating of the microfibers and the binding agent from the slurry to be deposited on the outside of the fabric shell. In the finished product, this coating is both porous and flexible or pliant and has film-like characteristics in that it is a continuous matrix of the binding agent in the form of a thin, porous membrane in which the inorganic microfibers are embedded. This contrasts with conventional inorganic fiber mats in which a binder resin is used to cement the fibers at the crossover points. This distinction, coupled with the use of an emulsion or latex containing binder resin particles of less than about 1 micrometer in size, and preferably less than 0.3 micrometer in size, gives the composite structure of this invention its desirable properties.

To achieve the flexible and porous qualities of the composite structure made according to this invention, the reinforcing, inorganic microfibers are present in the film-like coating in an amount in the range of from about 25 to about 75 parts by weight, preferably from about 40 to about 70 parts by weight, and most preferably from about 60 to about 67 parts by weight. The binding agent is present in an amount of from about 75 to about 25 parts by weight, preferably from about 60 to about 30 parts by weight, and most preferably from about 40 to about 33 parts by weight (the binding agent and the inorganic microfibers being present in the film-like coating in a total amount of 100 parts by weight based on the weight of the binding agent and the microfibers).

The inorganic microfibers used in this invention are in the form of microfibrous staple fibers. Glass microfibers, when used, have an average length in the range of from about 50 to about 3,000 micrometers and diameters in the range of from about 0.4 to about 4.0 micrometers, preferably in the range of from about 0.4 to about 2.0 micrometers, and most preferably in the range of from about 0.5 to about 1.2 micrometers. The aspect ratios of the glass fibers will generally lie in the range of from about 20:1 to about 1,000:1, preferably being on the order of about 100:1. Glass microfibers of this type are available from Johns Manville Corporation in various grades, e.g., grade 106 is a nominal 0.6 micrometer in diameter size with a 0.54–0.68 micrometer range, grade 104 is a nominal 0.45 micrometer size with a 0.40–0.55 micrometer range, grade 108A is a nominal 0.9 micrometer size with a 0.69–1.1 micrometer range and grade 112 is a nominal 3 micrometer size with a 2.6–3.8 micrometer range. Blends of different grades can also be used to provide different distribution of sizes than any one grade provides.

Other inorganic microfibers, such as metal, alumina or potassium titanate, may also be used but are less preferred. Mixtures of inorganic microfibers, such as glass and potassium titanate, may also be used. Such mixtures are desirable in applications where a lower permeability is desired since the potassium titanate fibers are generally finer than the glass fibers. The potassium titanate fibers typically have diameters in the range of from about 0.1 to about 0.5 micrometer, with a the preferred aspect ratio of about 50:1. Preferably, the lengths of these fibers are in the range of from about 5 to about 25 micrometers. A preferred mixture is about 80% by weight glass microfibers and about 20% by weight potassium titanate.

The binding agent, to be suitable for use in the subject invention, must have the following characteristics. It must (a) hold or bind the microfibers in place, and (b) when combined with the microfibers, form a structure that is porous as well as pliant or flexible. To provide the requisite porosity necessary for the structure to be gas permeable, the binder as mixed with the microfibers to form the slurry must be in particulate form (preferably in the form of an emulsion or latex), wherein the binder particles are less than about 1 micrometer in size and preferably less than about 0.5 micrometer. The binding agent should, for many applications be flame resistant as well as stable at temperatures encountered in the field, e.g., temperatures ranging from sub-freezing through ambient conditions and as high as 120° F.

A preferred binder (particularly when fire resistance is desirable) is a heteropolymer formed from vinyl chloride monomer and ethylene, most preferably an ethylene-vinyl chloride acrylamide terpolymer. Materials of this type are available from Air Products and Chemicals, Inc. under the trademark AIRFLEX ®. Particularly preferred is AIRFLEX ® 4500, an ethylene-vinyl chloride terpolymer with amide functionalities in the form of an emulsion. The solid content of this emulsion is at least about 50 weight percent and the average particle size is about 0.12 micrometer.

Other preferred binders, where a high level of temperature or fire resistance is not critical, are ethylene vinyl acetate emulsion copolymers. These materials are described in some detail in an article in the September 1968 edition of *Paint Manufacture* entitled "Vinyl Acetate/Ethylene Emulsion Copolymers". A preferred copolymer of this type is 100HS/EVA available from Air Products and Chemicals, Inc. It is an ethylene vinyl acetate emulsion copolymer having average particle sizes of less than one micrometer and a low curing temperature.

The liquid slurry used in this invention is preferably prepared by the following general process:

The inorganic microfibers are mixed with water. When glass microfibers are used, the pH of the water prior to addition of the microfibers is preferably adjusted to an acidic pH, most preferably about 5, although pH's in the range of about 3 to about 11 may be used.

After agitation to form a slurry, the binding agent, as an emulsion or latex, is added. The resulting mixture, having (a) a solids content of from about 0.5 to about 20 weight percent, preferably from about 0.5 to about 10 weight percent, and more preferably about 2 weight percent, and (b) a viscosity in the range of from about 1 to about 100 centipoise at ambient conditions, and preferably less than about 30, is then mixed for an extended time to provide a uniform slurry. The mixing time is preferably from about 20 to about 60 minutes. The slurry is then deposited on the fabric shell, which has been placed on a perforated form, by immersing the form in the slurry and drawing a vacuum on the inside of the form. This draws the microfibers and binding agent against the shell. The form and the shell are then withdrawn from the liquid slurry, with the deposited microfibers and binding agent adhering to the outside of the shell. After removal of residual water, by the continued application of the vacuum, the composite structure is placed in a curing oven both to dry the shell and to set the binding agent into the desired shape.

A preferred method for preparing the liquid slurry used in this invention, with the preferred fibers, i.e., glass microfibers, comprises the following steps:

(1) about 1,000 parts of water are placed in a tank and the pH of the water is adjusted to about 5 with an organic or an inorganic acid, e.g., sulfuric acid.

(2) A blend of (a) glass microfibers having diameters between about 0.1 and 1.2 micrometers and aspect ratios on the order of 100:1 and (b) potassium titanate fibers having diameters of about 0.1 to 0.5 micrometer and aspect ratios on the order of about 50:1, in a weight ratio of glass fibers to potassium titanate fibers of about 4:1, are dispersed in the water in an amount such that about 1 part of the inorganic microfibers is present to about 1,000 parts by weight of water. The inorganic microfibers are dispersed in the water with agitation at ambient conditions.

(3) To this dispersion is added the binder agent in the form of a water-based emulsion containing 15 percent by weight of solids of the binder resin. The binder resin emulsion is added in an amount such that the solids content of the emulsion, i.e., the weight of the binding agent, is present in an amount of about 1 part by weight solids to two parts by weight of the inorganic microfibers present. Thus the ratio of the binder resin solids to the inorganic microfibers is about 1:2.

After the shell and the form have been immersed in the liquid slurry prepared according to the steps set out above, the resulting composite structure is passed through a dryer at a temperature of from about 220° to 350° F., and preferably about 300° F., for about two minutes. This sets the matrix in the desired shape and dries the fabric shell.

The composite structure is then rendered hydrophobic and oleophobic, and may also be made resistant to solvents and detergents, by a post-treatment of the composite structure with an appropriate treating agent. Alternatively, the treating agent may be combined with the microfibers and binding agent in the slurry. While this alternative would simplify the process of manufacture, the post-treatment of the composite structure is considered to provide a more desirable structure with enhanced properties of oleophobicity, hydrophobicity, and detergent and solvent resistance, and is consequently preferred.

Fluorochemicals comprise the preferred treating agents. These agents can have varied chemical structures. See for example U.S. Pat. No. 3,489,148 and the patents cited therein at column 4. Particularly preferred compositions contain perfluorinated fluorochemicals. These types of materials are available from Minnesota Mining & Manufacturing Company under the designations FC-807, FC-809 and FC-824. The active ingredients in FC-807 and FC-809 are described in detail in the Federal Register, Volume 37, No. 96, at pages 9762–63. Specifically, they are liquid based compositions containing as the active solids a minimum of about 40% of ammonium bis (N-ethyl-2-perfluoroalkylsulfonamido ethyl) phosphates, wherein the alkyl group is more than 95% $C_8$ and the fluorine content is from 50.2 to 52.8% by weight. FC-824 is a perfluoroacrylate copolymer.

These treating materials are preferably applied in the form of a dilute mixture comprising, e.g., seven parts per volume of water, 0.5 parts per volume of diethylene glycol monobutyl ether (available from Union Carbide Corporation under the trademark BUTYL CARBITOL ®) as a fugitive wetting agent and 2.5 parts by volume of the fluorochemical treating agent (which typically will contain at least 40% by weight solids). The 2.5 parts by volume referred to above is based upon the total volume of the fluorochemical treating agent, e.g., FC-824 as received from the manufacturer. To prepare the dilute treating mixture, the water and n-butyl alcohol should be premixed and the fluorochemical treating agents slowly added with mixing.

After the composite structure has been treated, for example by spraying the dilute treating agent onto the structure, it is then dried, preferably at about 250° F.

The film like coating of the composite structure of the subject invention has a porosity or permeability of from about 0.01 to about 100 cubic feet of air per square foot of surface area per minute at a pressure of 0.5 inches WC and a temperature of 20° C. The coating is oleophobic and resists oil-based aerosols to a minimum of 60 inches WC (approximately 2 psi) and is hydrophobic to resist water immersion and spray to a minimum of 5 psi.

The following example describes the manner in which the composite structure of the subject invention may be formed. This example is illustrative and the invention should not be considered as limited thereby.

A surface-treated fabric comprised of a nylon/cotton blend and having a basis weight of about 7.5 ounces per square yard is formed into a shell having the general contour of a human hand. This shell is mounted on a perforated form, which is preferably comprised of stainless steel mesh. The form is then immersed in a slurry comprised of glass fibers having diameters in the range of from about 0.4 to about 1.2 micrometers and an equal weight of potassium titanate fibers having diameters in the range of from about 0.2 to about 0.5 micrometer. The slurry also contains about 50% by weight of the ethylene/vinyl acetate copolymer binding agent solids (based on the weight of the fibers). In this way, fifty parts by weight of the binding agent solids and 100 parts by weight of the inorganic fibers will be present. A vaccum is drawn in the interior of the form to cause the binding agent and the fibers from the slurry to be deposited on the outside of the fabric shell.

After extracting the form and the shell with the deposited microfibers and binding agents from the fibrous slurry and passing it through the drier, the total solids remaining from the slurry will be about 5 grams per square foot or about 1.6 ounces per square yard, providing a total basis weight for the coated integral structure of about 9.1 ounces per square yard. The resulting composite structure will have a caliper of about 0.4 mils and an air permeability at 0.5 inches WC of about 0.26 cubic feet per square foot per minute at a temperature of 20° C. The average pore is about 0.5 micron.

This composite structure is then impregnated with a 4% solution of the preferred fluorochemical treating agent described above and then dried to produce the hydrophobic and oleophobic hand covering of the subject invention. The integral structure of this example has a hydrostatic resistance to penetration of 5 psi and is solvent and detergent resistant.

To increase the wear characteristics of the protective hand covering of this invention, an abrasion resistant material may be applied to the high wear areas of the composite structure. Butyl rubber is suitable for this purpose. It should be understood, however, that wherever a layer of butyl rubber is applied, it will eliminate the microporous feature of the composite structure.

Preferred embodiments of the subject invention will be described further by reference to the drawings.

BRIEF DESCRIPTION OF THE DRAWINGS

As shown in FIG. 1, the fabric shell 1 overlies a perforated form 2 (revealed by drawing back a portion of the fabric shell 1), and together with said perforated form 2 is immersed in the slurry 3 contained in a vessel 4. The vessel 4 is provided with agitation means 5 to insure uniform distribution of the slurry components. Attached to the porous form 2 is a suction line 6 which is in turn connected to a vacuum source (not shown).

FIG. 2 is a cross sectional view of a finger portion of the fabric shell 1 mounted on the perforated form 2, but it is representative of the cross section of the fabric shell and porous form 2 generally. As shown in FIG. 2, the porous form 2 comprises a core element 7 which is connected (not shown) to the suction line 6 and which has a plurality of perforations 8 through which air is withdrawn. Surrounding the core element 7 is a stainless steel screen 9. Thus, upon withdrawing air through the core element 7, the slurry is deposited on the surface 10 of the fabric shell 1.

DEFINITIONS AND TESTING PROCEDURES

Figure 1:
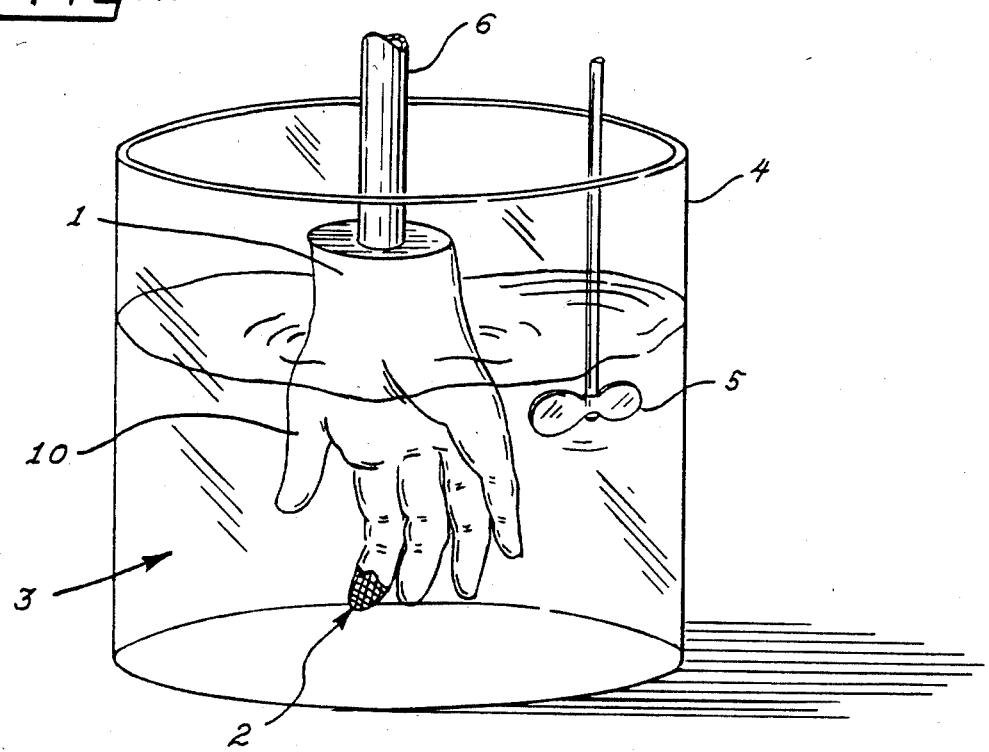
FIG. 1 illustrates an apparatus for depositing the slurry on the surface of the fabric shell.
Figure 2:
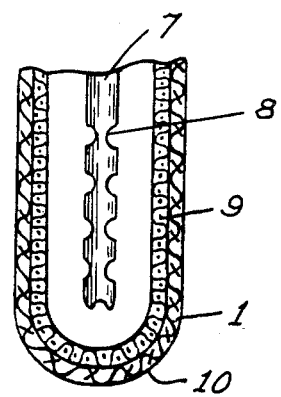
FIG. 2 is a cross section of a finger portion of the fabric shell on the perforated form.

As used herein, the following terms have the meanings set out below:

Hydrophobic: As used herein, this term refers to the ability to shed water, i.e., the material does not become wetted with water and water does not penetrate the structure of the material. The following test is used to characterize materials used in this invention as being hydrophobic: A square of the material, about 5 inches on the side, is positioned at a 45° angle to the horizontal and five drops of water from an eye dropper are dropped onto the surface of the material from a height of about 6 inches. If the water droplets roll off the surface and do not penetrate or wet the structure, that structure is defined as hydrophobic for the purposes of this invention.

Oleophobic: As used herein, this term refers to the ability to shed an oil-based composition, i.e., the material does not become wetted with the oil-based composition nor does it penetrate the structure of the material. The same test as that described for hydrophobicity, except that five drops of mineral oil are substituted for the water drops, is used to characterize material used in this invention as oleophobic. If the mineral drops agglomerate but do not wet or penetrate the surface of the structure, the material is defined as oleophobic for the purposes of this invention.

Detergent resistant: As used herein, this term refers to the ability to shed a detergent-based composition, i.e., the material does not become wetted with the detergent-based composition nor does it penetrate the structure of the material. The same test as that described for oleophobicity, except that five drops of a water based detergent composition, such as Tween 20, a polyoxyethylene sorbitan monolaurate available from Atlas Powder Company (at a concentration of 20 weight percent in water), are substituted for the mineral oil drops, is used to characterize material used in this invention as detergent resistant. If the detergent collects but does not wet or penetrate the surface of the structure, the material is defined as detergent resistant for the purposes of this invention.

Solvent resistant: As used herein, this term refers to the ability to shed a solvent-based composition, i.e., the material does not become wetted with a solvent-based composition nor does it penetrate the structure of the material. The same test as that described above for oleophobocity, except that five drops of a 20% solution of isopropyl alcohol in water are substituted for the mineral oil drops, is used to characterize material used in this invention as solvent resistant. If the solvent agglomerates and does not wet or penetrate the surface of the structure, the material is defined as solvent resistant for the purposes of this invention.

Another test commonly used to determine the resistance of a structure, such as a fabric, to a test material, such as water, oil, a detergent composition or a solvent, is the "stain" test. In this test, a small amount of the test material (e.g., one or two drops) is placed on the structure (while the structure is held in a horizontal position) and the size of the test material (stain) is measured after a specified time, e.g., 30 seconds. The larger the size of the stain, the less resistant the structure is considered to be to the test material. With the composite structure of the subject invention, not only do the drops of water, mineral oil, detergent composition or solvent not increase in size over 30 seconds, they are capable of being completely blotted up, e.g., with a paper towel, without leaving a stain. With many other air permeable structures that have been treated in an attempt to render them oleophobic, a stain of mineral oil (or other test material used to determine the structure's oleophobicity) is formed which cannot be completely blotted up.

I claim as my invention:

1. A process for the manufacture of a protective hand covering comprising the steps of:

placing a pliant, porous, fabric shell having the general configuration of a human hand over a perforated form;

immersing the form in a liquid slurry so that the outer surface of the shell is in contact with the slurry, said slurry comprising:

from about 25 to about 75 parts by weight of inorganic, reinforcing microfibers, and from about 75 to about 25 parts by weight of a polymeric binding agent in the form of a continuous matrix and which is derived from an emulsion or latex of the binding agent in which the particles of the binding agent are less than about 1 micrometer in size, the binding agent and the microfibers being present in the liquid slurry in a total amount of 100 parts by weight, based on the weight of said binding agent in said microfibers;

drawing a vacuum in the interior of the form to cause the binding agent and fibers from the slurry to be deposited on the outside of the fabric shell;

withdrawing the form and the shell with the deposited microfibers and binding agent adhering thereto from the fibrous slurry;

curing the composite structure to set the matrix in the desired shape; and treating the composite structure with an agent to render it hydrophobic and oleophobic whereby a protective hand covering is provided which will resist the passage of oil and water-based compositions while allowing the passage of air and water vapor.

2. The process of claim 1 wherein the inorganic, reinforcing microfibers comprise glass microfibers.

3. The process of claim 1 wherein the inorganic, reinforcing microfibers comprise a mixture of potassium titanate and glass microfibers.

4. The process of claim 1 wherein the inorganic, reinforcing microfibers are glass and have diameters within the range of from about 0.5 to about 2.0 micrometers and aspect ratios of from about 20:1 to about 1,000:1.

5. The process of claim 1 wherein the polymeric binding agent is a copolymer of ethylene and vinyl acetate.

6. The process of claim 1 wherein the polymeric binding agent is a copolymer of ethylene and vinyl acetate and wherein the copolymer has chlorinated side chains.

7. The proces of claim 1 wherein said treating agent comprises a fluorinated hydrocarbon.

8. The process of claim 1 wherein the fabric shell is a material selected from the group consisting of a polyester, a polyamide, cotton or rayon.

9. The process of claim 1 wherein the fabric shell is a polyaramid.

10. The process of claim 1 wherein the perforated form is comprised of stainless steel mesh.

11. The process of claim 1 including the step of treating the composite structure with an agent to render it detergent and solvent resistant.

12. The process of claim 1 including the step of applying an abrasion resistant material to a portion of the composite structure.

13. The process of claim 12 wherein the abrasion resistant material is butyl rubber.

14. A handcovering formed by the process of claim 1.

15. The handcovering of claim 14 wherein the porosity is in the range of about 0.01 to about 100 cubic feet or air per square foot of surface area per minute at a pressure of 0.5 inches WC and a temperature of 20 degrees Centigrade.

16. The handcovering of claim 15 wherein the porosity is in the range of from about 0.1 to about 20.

* * * * *